United States Patent [19]
Jones

[11] Patent Number: 5,386,267
[45] Date of Patent: Jan. 31, 1995

[54] LIGHT INTEGRATING CAVITY FOR A FILM SCANNER

[75] Inventor: Robert S. Jones, Rochester, N.Y.

[73] Assignee: Eastman Kodak Company, Rochester, N.Y.

[21] Appl. No.: 197,775

[22] Filed: Feb. 16, 1994

[51] Int. Cl.$^6$ .............................. F21V 7/00; G01J 1/00
[52] U.S. Cl. ........................................ 355/7; 355/71; 355/84; 358/484; 358/497
[58] Field of Search ................... 358/484, 497; 355/67, 355/71, 84

[56] References Cited

U.S. PATENT DOCUMENTS

| | | | |
|---|---|---|---|
| 3,875,587 | 4/1975 | Pugsley | 358/80 |
| 4,430,000 | 2/1984 | Eldering et al. | 356/236 |
| 4,575,252 | 3/1986 | Akiyama | 356/446 |
| 4,868,383 | 9/1989 | Kurtz et al. | 355/67 X |
| 5,079,678 | 1/1992 | Parker | 362/84 |
| 5,150,158 | 9/1992 | Lah et al. | 355/71 X |
| 5,155,596 | 10/1992 | Kurtz et al. | 358/214 |
| 5,215,370 | 6/1993 | Kaplan | 362/296 |
| 5,241,459 | 8/1993 | Kaplan et al. | 362/298 |
| 5,268,749 | 12/1993 | Weber et al. | 356/446 |
| 5,274,228 | 12/1993 | Kaplan | 250/228 X |

Primary Examiner—Michael L. Gellner
Assistant Examiner—Daniel P. Malley
Attorney, Agent, or Firm—David M. Woods

[57] ABSTRACT

A film scanner having a support frame for supporting a high intensity light source and a light integrator with respect to a film scanning gate, and apparatus for pivotally moving the light integrator out of the way to facilitate access to the scanning gate. The light integrator has a sealed integrating cavity with a sealed end port for admitting light from the high intensity source and an elongated, sealed light emitting bar for directing the line of light onto the film plane of the film scanning gate at a distance from the light integrating cavity. The light integrator is constructed of two half sections joined to form the cylindrical cavity and a rectangular receptacle for the light conducting bar. A conical internal cavity, light input member is joined at the narrow cone end to an offset input port in one end of the cavity and is mounted by a rotatable bearing to the frame. The conical internal cavity is aligned at the wide cone end opening to the light source, and trim and infra-red filters are positioned therebetween. The light input member of the integrator is pivoted on the bearing by a motor driven link arm from a scanning position close to the film plane into a standby position with the light bar pivoted away from the scanning plane to provide access to it to change from a negative filmstrip to a slide scanning gate.

19 Claims, 4 Drawing Sheets

LIGHT INTEGRATING CAVITY FOR A FILM SCANNER

CROSS REFERENCE TO RELATED APPLICATIONS

Reference is made to U.S. patent application Ser. Nos. 167,643 filed on Dec. 14, 1993, and entitled "Film Clamp For Flattening Image Frames in a Scanning Gate"; Ser. No. 08/197,777 filed on Feb. 16, 1994 and entitled "Passive Film Take-up Chamber"; Ser. No. 08/197,778 filed on Feb. 16, 1994 and entitled "Film Positioning Method and Apparatus"; Ser. No. 08/197,774 filed Feb. 16, 1994 and entitled "Film Latent Image Bar Code (LIBC) Reader"; and Ser. No. 08/201,282 filed on Feb. 16 , 1994 and entitled "Film Scanner With In-Line Dual Scanning Gates".

FIELD OF THE INVENTION

The present invention relates to a light integrator for generating a linear, diffuse light source for a film scanner, and more particularly to a simplified construction, air-tight light integrator mounted to pivotally rotate from an operating orientation in close relation to the film scanning gate to a standby orientation to allow access to the film scanning gate.

BACKGROUND OF THE INVENTION

Conversion of analog images into digital data has become widespread for a variety of applications, including storing, manipulating, transmitting and displaying or printing copies of the images. For example, images captured in photographic media are converted to digital data and stored on compact discs for readout and display as a video image, as exemplified by the KODAK® Photo-CD system, or reproduced employing various types of color printers. In order to convert the photographic image into a set of digital line data, the film image frame is transported through a film scanning station past, and illuminated in each scan line with a linear light beam of uniform, diffuse illumination, typically produced by a light integrating cavity or integrator.

With respect to light integrators per se, various configurations are known in the art of still and telecine film scanners and typically include an elongated cylindrical integrating cavity having diffusely reflective walls and an output slit which extends parallel to the longitudinal axis of the cylindrical integrating cavity. Improved light integrators for such uses are disclosed in commonly assigned U.S. Pat. Nos. 4,868,383 and 5,241,459, and also include a light source for generating an intense beam of light and an optical system for directing the beam end-wise into the cavity through an input port that is offset from the longitudinal axis of the cavity and is angularly offset from the input port by less than 180°. The introduced light is diffusely reflected in the cavity and is emitted from the elongated slit as a uniform intensity, diffuse line of light. In the U.S. Pat. No. '459 patent, the light source and optical system introduce high intensity light through the input port at an angle that is not parallel to the longitudinal axis or the exit slit of the cavity. Such light integrators produces a line of diffuse, Lambertian light which has a uniform linear and angular distribution, and excellent line scan results can be obtained over a wide range of operating conditions.

The light transmitted through the illuminated scan line of the image frame is focused by a lens system on a linear CCD array, image detector which typically produces three primary color light intensity signals for each image pixel that are digitized and stored. The digitized signal values for each scan line may be formatted to a standard for video recording and display and stored on compact disc or magnetic media. Such film scanners take a variety of forms, and the various common aspects of film image frame digitizing, particularly line illumination and linear CCD array-based digitizers, are described in greater detail in commonly assigned U.S. Pat. No. 5,155,596.

In order to perform line scanning of each image frame of photographic negative filmstrips, it is necessary to provide an accurate film transport mechanism to transport a filmstrip into a scanning gate and hold the image frame flat in alignment with a scanning aperture. Typically, the linear CCD array and scanning light beam are stationary, so that the light beam illuminates a line of the filmstrip image frame, and a line of digitized data is stored. The scanning gate containing the filmstrip image frame is incrementally moved or translated line-by-line by a stepping drive motor until the entire image frame is digitized. Then a new image frame is positioned and flattened for scanning and digitizing. Such a scanning and digitizing system for Photo-CD conversion is embodied in the KODAK ® PIW Model 2400 Photo-CD scanner system marketed by the assignee of this application.

In this film scanner, the scanning plane is vertical and the stationary scanner components are oriented horizontally. The filmstrip is advanced past the stationary scanner components in a first pass for scanning the image frames at a low resolution sufficient to provide a video display of each image frame on a monitor for viewing by the operator. The color balance of the scanned and digitized image pixel data is automatically adjusted to the color balance characteristics of the video display. The operator may further adjust the displayed color balance or tone and intensity of the color display while viewing the result of the adjustments until satisfied, whereupon the adjustment factors for that image frame are stored. The orientation of the image may also be stored with the digitized data so that the CD player can rotate the image data 90° for display as a video image at the same aspect that the image was captured by the photographer.

As each image frame is scanned in this first pass, the scanned image frames of the vertically oriented filmstrip are advanced into a stationary take-up chamber. The take-up chamber is provided within the scanner to temporarily hold the filmstrip and isolate it from other apparatus that it could catch on and to keep it clean. After all image frames are scanned, the trailing end of the filmstrip is retracted from the chamber and advanced in the reverse direction into the scanning gate one frame at a time. Then each image frame is scanned at high resolution for digitizing the image as a field of data associated to the data derived in the low resolution scan of the same image frame. The filmstrip is transported out the exit of the translation stage for removal by the operator when scanning of all frames is completed.

In order to scan positive color transparencies in mounts, i.e. slides, employing common components of the same film scanner station, it is necessary for the operator to manually replace the film translation stage and substitute a slide translation stage in the Model 2400

Photo-CD scanner. The replacement is tedious and mechanical breakdowns are possible in attempting the exchange of the translation stages.

For efficiency and high resolution, the film scanning registration planes of the film image frames in the respective scanning gates are held very close to the linear light emitting slit or surface of the light integrator. The light integrator remains stationary in its horizontal orientation. It is not desirable to remove and replace the integrator each time the slide scanning gate must be positioned in or taken out of the scanning station, since doing so may lead to misalignment or damage.

Problems to be Solved by the Invention

It is desirable to improve the speed and operating efficiency of film scanners by obviating the need to manually replace the slide and negative filmstrip scanning gates and associated mechanism to alternately scan slides and negative filmstrips. To satisfy this desire, there is a need for a linear light integrator in which the linear distribution can be very closely controlled in order to control the intensity of the light emitted onto the film image frame and which is not susceptible to disturbance due to frequent retraction from the close scanning position to a standby position to allow automatic insertion of the appropriate film scanning gate in the scanning station.

There is also a need in such scanners for an inexpensive and durable light integrator assembly that is not susceptible to dust contamination and may be repeatedly moved into and out of the scanning position in the film scanning station to provide access to the film scanning gate. While scanner integrating cylinder linear light sources, they remain sensitive to precise adjustment and alignment of the external light source to the input port and exit slit and the exit slit to the film scanning plane. Consequently, they are difficult to remove and later re-position accurately in the film scanning station. Difficulties also remain in achieving efficiency and uniformity in light intensity emitted along the length of the slit at reasonable cost. Furthermore, heavy use of such film scanners may result in contamination of the white interior reflective walls of the cavity with dust entering the light entrance port or exit slit.

SUMMARY OF THE INVENTION

Accordingly, it is one object of the present invention to provide an inexpensive yet efficient, light integrator for a film scanner.

It is a further object of the invention to provide such a light integrator having a sealed, light entrance port and light emitting bar for emitting a uniform intensity line of diffuse illumination in the scanning position of a film scanner.

It is another object of the present invention to provide such a light integrator that is readily movable from a scanning position in a film scanning station to a standby position to provide access to the film scanning gate area.

It is a still further object of the invention to provide such a movable light integrator to facilitate the installation and removal of a slide scanning gate for a negative filmstrip scanning gate in the film scanning station of a negative filmstrip scanner in order to alternatively scan negative filmstrip image frames or slide image frames.

These and other objects of the invention are realized in a film scanner having a support frame for supporting a high intensity light source and a light integrator having a sealed integrating cavity with a sealed input port for admitting light from the high intensity source and an elongated, sealed light emitting bar for directing the line of light onto the film scanning plane, wherein the light integrator is pivotally attached to the support frame to pivot about the sealed end port from a scanning position, where the light bar is in close proximity to and directs the line of light onto the film scanning plane, into a standby position, where the light bar is pivoted away from the film scanning plane to provide access thereto.

In a further aspect of the invention, a linear light integrator of the type employed in a film scanner for integrating light from a light source of diverging illumination and forming a line of uniform intensity, diffuse illumination at a film scanning plane comprises an elongated, generally cylindrical, light integrating cavity having diffusely reflecting walls defining an input port in one end thereof through which light from the light source is introduced into the cavity, and a longitudinal slit in a side wall extending parallel to the longitudinal axis of the cavity through which reflected and integrated diffuse light exits the cavity. An elongated light conducting bar is associated with the elongated slit for conducting light exiting the slit in a direction extending away from the cavity and for emitting the conducted light in a line of uniform intensity, diffuse illumination from a sealed end face of the elongated light conducting bar at a predetermined distance from the exit slit adjacent the scanning plane. A light input member concentrates and conducts diverging light from the light source into the input port of the light integrating cavity, and a seal is formed over the light input member formed of a material transparent to light emitted by the light source for sealing the light integrating cavity from the infiltration of contaminants.

In particular, the light input member includes a relatively wide opening in a first end thereof having the seal formed therein and positioned to admit diverging light beams emitted by the light source and to concentrate and direct admitted light beams through the input port, the input port comprising a relatively narrow opening in the second end of the light input member to one side of the light integrating cavity axis, the light input member formed as a generally conically shaped light conducting cavity having an axis tilted to the light integrating cavity axis, whereby light entering the relatively wide opening is reflected through the light conducting cavity and out the narrow end opening onto a side wall of the light integrating cavity, such that the light beam is reflected and integrated in the cavity before exiting the elongated slit and entering the light conducting bar.

Advantageous Effects of the Invention

The light integrator advantageously is constructed of inexpensive components, is durable and sealed from contamination while providing high quality, uniform intensity line of diffuse illumination for scanning. The mounting and control of rotation of the light integrator between the scanning and standby positions is rapidly and automatically completed to gain access to the scanning plane and gate areas to allow automatic repositioning of the negative filmstrip and slide clamps into the film scanning gate area and avoids difficulties in manually removing, installing and re-aligning the light integrator.

BRIEF DESCRIPTION OF THE DRAWINGS

Other objects, advantages and features of the present invention will become apparent from the following specification when taken in conjunction with the accompanying drawings in which like elements are commonly enumerated and in which.

DETAILED DESCRIPTION OF THE PREFERRED EMBODIMENT

The drawings depict the construction and operation of the preferred embodiment of the light integrator of the invention in the context of film scanner having a negative filmstrip scanning gate and a slide scanning gate on a scanning gate frame that may be alternately positioned in the scanning station. The respective scanning gates are mounted at different points on the elongated scanning gate frame coupled to a movable carriage.

Negative filmstrips are introduced in an input slot in the film scanner housing and pre-positioned in a filmstrip transport and LIBC reader assembly until scanning of a preceding filmstrip is completed and the preceding filmstrip is ejected from the filmstrip output slot. Then the pre-positioned filmstrip is advanced by roller drive assemblies in a forward direction through the negative filmstrip scanning gate during pre-scanning, and into a filmstrip take-up chamber coupled to the scanning gate frame. After pre-scanning is complete, the negative filmstrip is advanced back through the filmstrip scanning gate an image frame at a time, clamped in the gate and main-scanned. As each image frame is mainscanned, the filmstrip is advanced out the output slot. During main-scanning, the next filmstrip may be prepositioned in the transport and LIBC reader assembly for scanning.

The film scanner also includes an input/output slot for introducing the slides into and from a slide scanning gate on the movable scanning gate frame. The carriage and scanning gate frame are driven in the forward or reverse directions on a track by a carriage drive motor to alternately position the slide scanning gate into the scanning station for the slide pre-scan and main-scan operations and to re-position the slide scanning gate at the slide input/output slot so that the scanned slide may be removed and the next slide to be scanned can be inserted. The carriage and scanning gate frame are also advanced during the pre-scan and main-scan of the slide image frame in the slide scanning gate positioned in the scanning station.

In accordance with the present invention, the scanning station is provided with a light integrator assembly that is of a particular configuration for scanning image frames in such a film scanner. In addition, the light integrator assembly is rotatable between a scanning position during film image frame scanning and a standby position during movement of the carriage and scanning gate frame order to move the slide scanning gate into and out of the scanning station. The film scanner is further described in the above-referenced applications, particularly the above-referenced ' (Docket 69,651) application.

Figure 1:
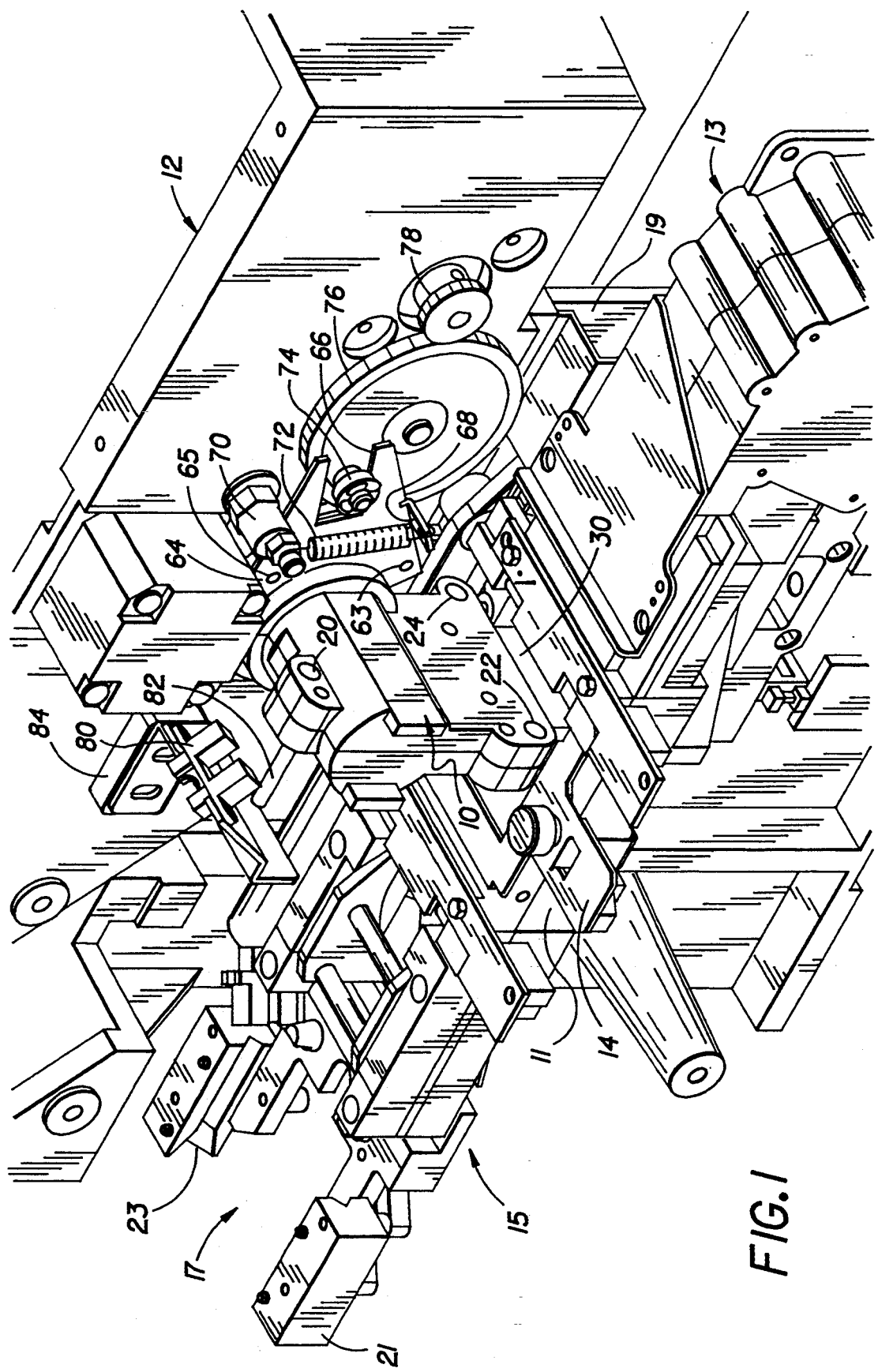
FIG. 1 is an isometric view of certain of the components of a film scanner, including the pivotal light integrator in the scanning position, in which a slide transport and centering apparatus may be optionally placed when the light integrator is pivoted.

In FIG. 1, the integrating cavity 10 is supported by stationary vertical frame 12 in relation to a negative filmstrip clamp and scanning gate 14 which positions a filmstrip image frame in a film scanning plane 25 (shown schematically in FIGS. 2, 4 and 5), described more completely in the above-referenced U.S. Pat. No. '643 application. It will be understood that a lens system and tri-color, CCD linear array are positioned below the filmstrip clamp and scanning gate 14 of FIG. 1 and the film scanning plane 25. All of these components are located within the housing of the film scanner and are accessible through an access door in the housing.

An elongated scanning gate frame 11 defines a filmstrip transport path and supports the negative filmstrip clamp and scanning gate 14 as well as a filmstrip take-up chamber 13 to its right and a diverter 15 and slide scanning gate 17 to its left. The elongated frame 11 is in turn supported by a carriage 19 that may be translated to the right and left from the position shown in FIG. 1 in a manner and for reasons described below.

Figure 2:
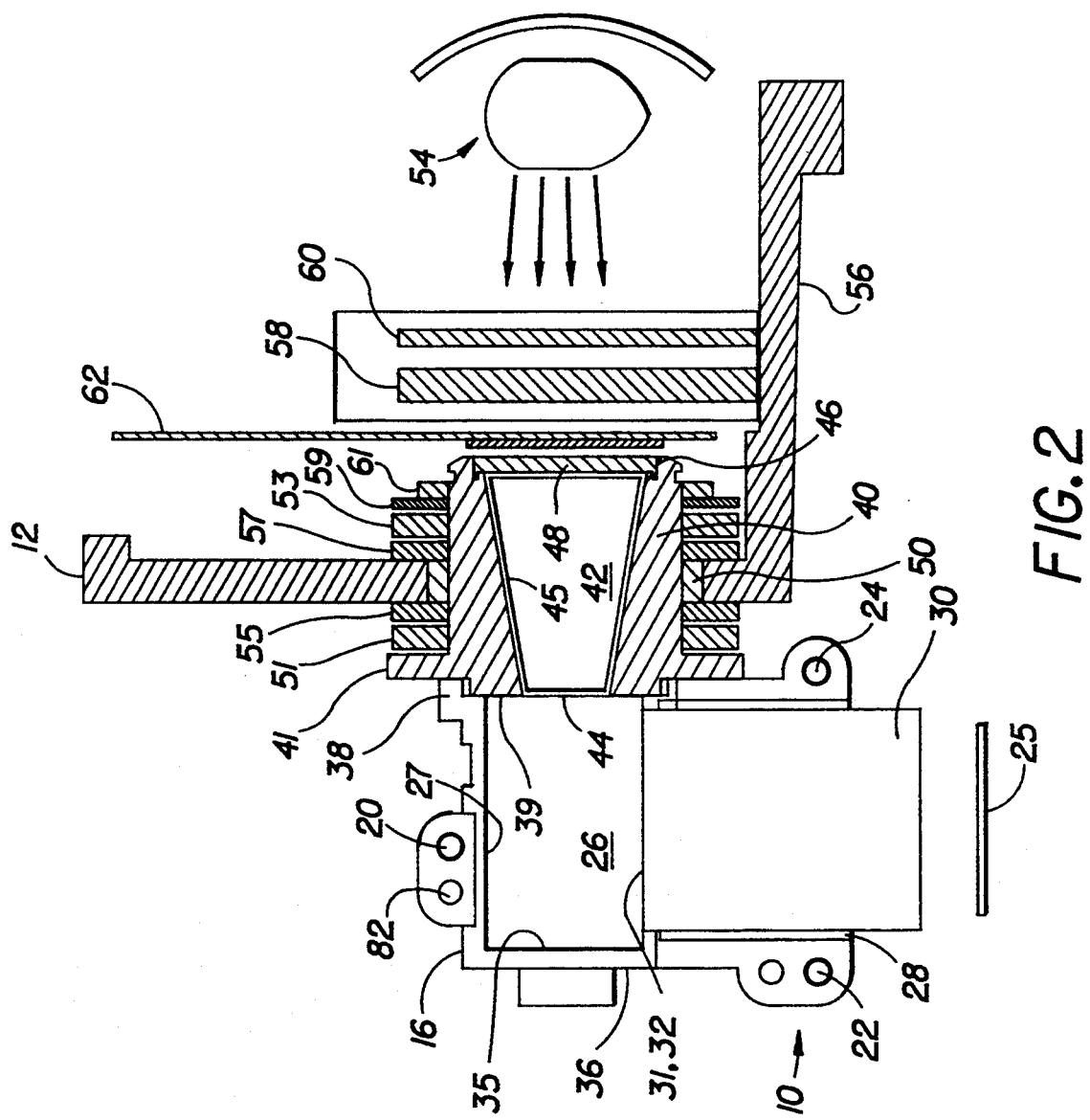
FIG. 2 is a side view in cross-section of the light integrator and frame of FIG. 1.
Figure 3:
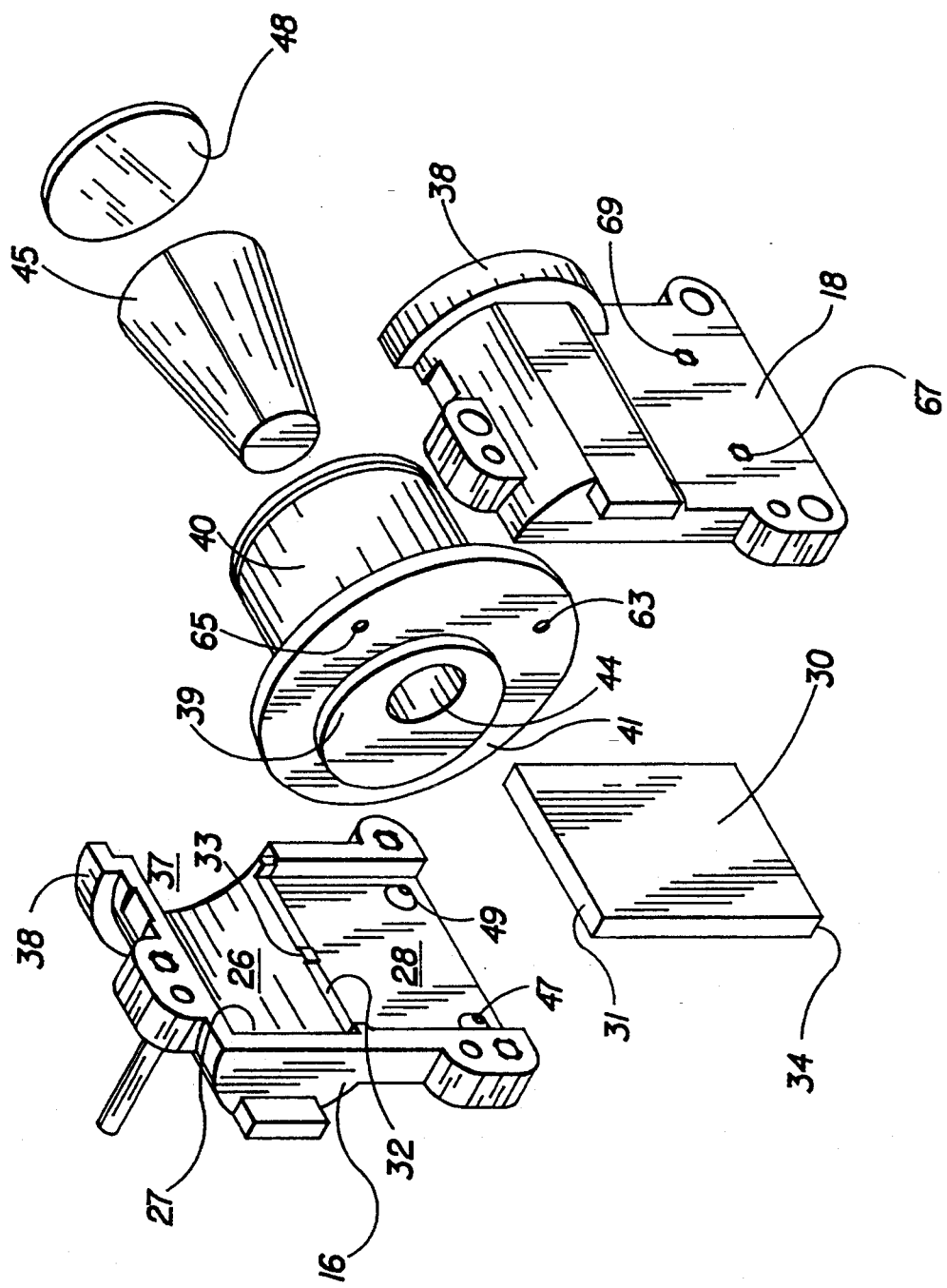
FIG. 3 is an exploded view of the components of the light integrator of the invention.

The light integrator 10 is constructed of the components depicted in the side cross-section view of FIG. 2 and the exploded perspective view of FIG. 3. A housing is formed by attachment of two cast aluminum housing half sections 16 and 18 having painted interior surfaces as described below. The half sections 16 and 18 may alternatively be machined from a plastic material, e.g. Spectralon plastic, available from Labsphere, Corp., North Sutton, N.H., or other suitable plastic or metal of the type described in the above-identified U.S. Pat. No. '383 patent, where it is not necessary to paint the interior side wall and end surfaces with reflective paint.

As shown in FIGS. 2–5, a light integrating, cylindrical cavity 26 and a rectangular receptacle 28 are formed by the interior walls of the two half sections 16 and 18 when they are attached together. The cylindrical light integrating cavity 26 has an elongated cylindrical side wall 27 coated with a white, reflective paint of the type identified in the above-referenced U.S. Pat. No. '383 patent. For the 35 mm film image frame scanning application, the integrating cavity 26 is about 33.5 mm long and about 22 mm in diameter.

A generally rectangular light conducting bar 30 is fitted into the rectangular receptacle 28 with an interior bar end face 31 oriented to an elongated, narrow slit 32 in and extending along the side wall length of the cavity 26. The light conducting bar 30 collects the light exiting slit 32 and emits the line of diffuse light from its exterior end bar face 34 and onto to the film scanning plane 25 of the slide or negative filmstrip scanning gate, whichever is present. The exterior end bar face 34 has a micro grit surface treatment effected by abrasion, and the surface treatment masks the imaging of the mating seam of the two half sections 16 and 18 or any other surface defects in the cavity 26 onto the film scanning plane 25.

The light conducting bar 30 may be constructed of any optically transparent glass or plastic and have a length of about 30 mm sufficient to illuminate the width of the film image frame of 35 mm filmstrips and slides. The width of the surface treated exterior end bar face 34 provides a scanning light line width of about 4 mm at the film scanning plane 25.

The light conducting bar 30 is tightly fitted into the rectangular receptacle 28 of the half sections 16 and 18 and held there by compression. The interior end of the bar 30 is fitted into the slit 32 against small bosses, e.g. boss 35 in slit 32 of half section 16. Pads 37 and 39 are formed in the half section 16 extending into contact with one side surface of bar 30 in receptacle 28. A pair of nylon bolts 67, 69 are screwed into holes in the other half section 18 with their flat heads bearing against the other surface of bar 30 in receptacle 28. The nylon deforms to form a tight attachment, and the arrangement inhibits dust infiltration into cavity 26. The half sections 16 and 18 are held together with fasteners 20, 22 and 22 extending through aligned tabs at the top and the corners of the two half sections 16 and 18 to form the housing of the light integrator 10.

As shown in FIGS. 1 and 2, a closed end 36 of integrator 10 is formed when the two half sections 16 and 18 are attached together. The interior end surface 35 of closed end 36 forms a light reflecting end of cavity 26 and is also coated with a highly reflective white paint. The other half ends of the half sections 16 and 18 are enlarged to form an end opening 37 surrounded by a circular shoulder 38, greater in diameter than the diameter of the cylindrical cavity 26 when half sections 16 and 18 are attached, to allow seating of a light input end face 39 of a rotatable, light input member 40.

The light input member 40 shown in FIG. 2 is formed exteriorly in the shape of a cylinder with a collar or flange 41, and in its interior with a generally cone shaped or conical, light conducting cavity 42 extending between a narrow cone end, circular opening 44 and a wide cone end, circular opening 46. The narrow cone end opening 44 is in the end face 39 of the light input member 40 that is fitted into the shoulder 38 and functions as an input port to the light integrating cavity 26. The end face 39 is also coated with the reflective white paint as described above and forms the partially open second end of the light integrating cavity 26 adapted to conduct light into the cavity 26.

Figure 4:
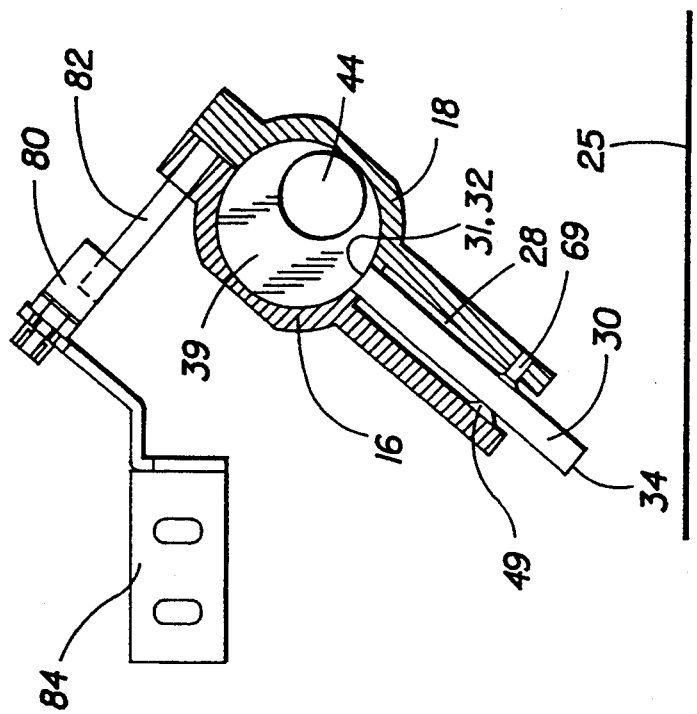
FIG. 4 is an end view in partial cross-section of the relative positions of the light integrator and a stop mechanism in the normal scanning position.
Figure 5:
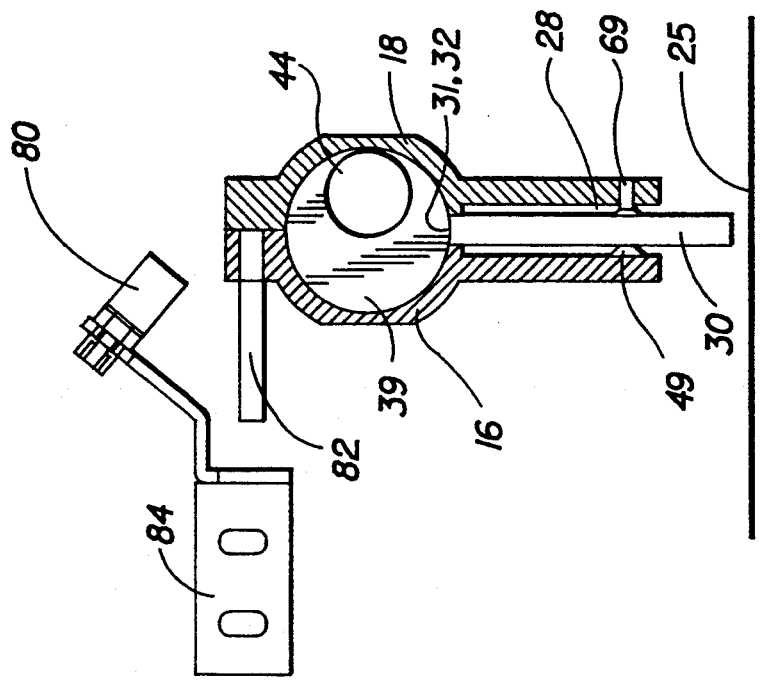
FIG. 5 is an end view in partial cross-section of the relative positions of the light integrator and the stop mechanism in the standby position.

The end face 39 is formed as a boss on the circular collar or flange 41 of the light input member 40 and is off center to the centrally disposed narrow cone end, circular opening 44 and the axis of the conical light conducting cavity 42. The narrow cone end opening or input port 44 therefore opens into the light integrating cavity 26 at a point toward one side thereof so that the axes of the longitudinal integrating cavity 26 and the light input member 40 are parallel to one another, but not aligned, as shown in FIGS. 3-5. The conical light conducting cavity 42 is therefore skewed to one side of the integrating cavity 26, so that the divergent light beams that are admitted through the wide cone end opening 46 are concentrated and partially reflected off the side wall 27 of the conical light conducting cavity 42. The concentrated light beams that exit through the narrow cone end opening 44 are therefore scattered off the elongated side wall 27 white surface before striking the white interior end surface 35.

The positioning of the light input port 44 is also at an angular displacement around the circumference of the cylindrical side wall with respect to the elongated slit 32, and the displacement is preferably greater than 0° and less than 180°. As depicted in FIGS. 4 and 5, the displacement is at about 90° radially from the exit slit 32 so that the concentrated light beam entering input port 44 is not directed directly into the slit 32 or against the side wall portion opposite to the slit 32 and directly visible through the light conducting bar 30.

The components of the light source are shown in FIG. 2. A tungsten-halogen light source or lamp house 54 (of the type described in commonly assigned U.S. Pat. No. 5,012,346, for example) is positioned on flange 56 of support frame 12 on the other side of light integrator 10 in alignment with the axis of conical light conducting cavity 42. The wide cone end opening 46 is sealed with a transparent glass cover 48, again to prevent dust infiltration into cavity 26 while admitting light from the lamp house 54.

A pair of infra-red light, heat absorbing filters 58, 60 and a filter wheel 62, are interposed between the lamp house 54 and the cover 48. Filters 58, 60 remove the heavy amount of infra-red light emitted by the tungsten-halogen light source. The filter wheel has different trim filters for optimizing the spectral light for either negative filmstrip or for positive slide film scanning. When switching between scanning of slides and negative filmstrips, the film scanner electronic control unit (not shown) rotates filter wheel 62 to present the proper filter in the optical path to provide the appropriate film type color balance. Such filters and their purposes and effects are identified in the U.S. Pat. No. '346 patent, incorporated herein by reference.

A conical shaped foil 45 of highly reflective material is fitted against the interior surface of the light conducting cavity 42 to effect the reflection and concentration of the input light beam. Other reflective coatings or reflectors could be substituted for the foil 45. The combined length of the integrator cavity 26 and the light conducting cavity 42 is about 66 mm. Due to its shape, length and highly reflective interior, the conical shaped light conducting cavity 42 concentrates the diverging, filtered light received from the lamp house 54 and emits it into the light integrating cavity through the input port 44.

The light input member 40 is formed of a similar material to the half sections 16, 18 and has a cylindrical exterior surface adapted to rotate in an opening in support frame 12. As described above, the light integrator is intended to be rotated form a scanning position to a standby position to provide access to the film scanning station. Rotation is facilitated by a sleeve bearing 50 fitted into the opening in support frame 12, thrust bearings 51, 53, washers 55, 57, 59 and a ring shaped spring fastener 61 holding the thrust bearings and washers in place, all shown in FIG. 2.

Turning now to the rotational control of the light integrator 10, a stepper drive motor (not shown) behind frame 12 in FIG. 1 is operated by the film scanner electronic control unit to rotate the light integrator 10 on the bearings into the standby position to reposition the scanning gates 17 or 14 in the film scanning station. The film scanner is provided with separate input slots and transport mechanisms for receiving either a negative filmstrip or a mounted slide and transporting it to the respective scanning gate 14 or 17. The scanning gates 14 and 17 are mounted on the common scanning gate frame 11, and normally the negative filmstrip scanning gate 14 is positioned in the scanning station as depicted in FIG. 1.

In that position of FIG. 1, the slide scanning gate is directly aligned to the slot for receiving a slide manually inserted into the jaws 21 and 23 which are mounted on pivotal links to the left end of scanning gate frame 11. Also, the negative filmstrip may be inserted in the PTR (not shown) and presented to the diverter 15 and into the drive roller assemblies for driving it into and through the negative filmstrip clamp and scanning gate 14 to effect the pre-scan and main-scan functions described in particular in the above-referenced ' (Docket 69,483) application.

To commence scanning of a negative filmstrip, the operator enters commands on a keyboard and the scanner is initialized to accept the negative filmstrip manually inserted into a negative insert slot in the housing. The carriage 19 is operated, if necessary, to position the negative filmstrip scanning gate 14 in the scanning station. The film clamp is released to allow filmstrip advancement through the scanning gate 14. The negative filmstrip is advanced into and by a particle transport roller (PTR) assembly (not shown but mounted above diverter 15), so that its pre-scan leading end is advanced to the diverter 15.

The diverter 15 is operable in a filmstrip accepting position during pre-scan to direct the leading end of the filmstrip advanced to the right into the nip of the left and right roller assemblies (obscured from view) on either side of the scanning aperture of the negative filmstrip clamp and scanning gate 14 The drive roller assemblies continuously advance the negative filmstrip to the right during the pre-scan of the image frames at a relatively high speed, with the film clamp dis-engaged.

The pre-scan trailing end of the filmstrip is detected and rightward movement is halted when the last image frame is pre-scanned. During this advancement, the filmstrip enters into the take-up chamber 13 at the right frame end. At the same time, the low resolution, prescan data is collected for each image frame, and the perf number data is derived from the right and left perf sensors (obscured from view). Perf data is employed with half step drive motor pulse data and image scan line data in tables for use in controlling filmstrip positioning in the main-scan. During the pre-scan, the carriage 19 coupled to the scanning gate frame 11 and associated components is stationary.

During main-scan, the direction of movement of the filmstrip is reversed to leftward, so that the pre-scan filmstrip trailing end becomes the main-scan filmstrip leading end. The diverter 15 moves up to its normal film eject position so that the filmstrip may be ejected, main-scan leading end first, out a separate ejection slot in the housing of the film scanner. Thus, a new filmstrip to be scanned can be inserted in the filmstrip insertion slot and staged by the PTR to be scanned after the previously scanned filmstrip is ejected, in a manner described more fully in the above-referenced ' (Docket 69,651) application.

During main-scan, the filmstrip is advanced a frame at a time into the film clamp by reverse drive of the drive roller assemblies employing the stored perf number vs. pre-scan line number tables to position the image frame accurately. The drive roller assemblies are halted, the film clamp is engaged, and the carriage drive motor (not shown) is energized. Carriage 19 is movable on the track under the control of the carriage drive motor to then incrementally translate the clamped filmstrip image frame to the right past the stationary scanning components to derive the high resolution line scan image data. Thereafter, the carriage again moves to the main-scan start position and the next image frame is positioned for main-scanning. The process is repeated until the image frames are all main-scanned and the filmstrip is ejected from the filmstrip output slot.

During filmstrip scanning, the integrator 10 remains in the scanning position, since carriage and scanning gate frame movement back and forth is limited to a single image frame distance.

For slide scanning when a slide is inserted into the jaws 21, 23, it is necessary to pivot the integrator 10 clockwise to lift the light bar 30 out of the scanning aperture of the gate 14 to position the slide scanning gate 17 into the scanning station. Because of the close tolerances and the positioning of other filmstrip handling structure between the two scanning gates on the scanning gate frame 11, it is necessary to move the light integrator 10 light bar 30 out of the way during such positioning.

The light integrator 10 is pivoted as described more particularly hereafter to the standby position of FIG. 5 during such movement of the scanning gate frame 11 by carriage 19. The carriage 19 translates the scanning gate frame 11 to the right to position the slide scanning gate 17 into registration with the film scanning plane 25.

After the slide in the slide scanning gate 17 is positioned in the scanning plane 25, the light integrator 10 is pivoted back to the scanning position of FIG. 4. Due to the particular design of the film scanner in which the light integrator 10 of the present invention is employed, low and high resolution scans of the slide image are successively conducted to provide the digitized scan data. Thus, the slide and slide scanning gate 17 are translated in forward and reverse directions by the carriage 19 past the light emitting end face 34 of light bar 30 as pre-scanning and main-scanning of the slide is completed.

After scanning and digitizing is completed, it is necessary to re-energize the carriage drive motor to reposition the scanning gates to the normal position of FIG. 1 and present the scanned slide in the slide slot so that it may be grasped and removed manually from the jaws 21, 23. In that movement, it is again necessary to first pivot the light integrator 10 from the scanning position of FIG. 4 into the standby position of FIG. 5 and to then move it back to the scanning position when the negative filmstrip clamp and scanning gate 14 is repositioned into the scanning station.

Returning to FIG. 1, it depicts one manner of effecting the movement of the integrating cavity 10 between the standby and scanning positions. A plate 64 fastened by bolts 63', 65' to the bolt holes 63, 65 in the circular collar 41 extends outward and forms U-shaped jaw opening 66 in its free end. The U-shaped opening or notch surrounds a roller wheel 74 which is attached to a gear disk 76 which is rotatable clockwise and counterclockwise. The disk 76 has edge gear teeth that engage gear teeth of drive gear 78 that is rotated by a bi-directional stepping motor mounted behind the frame 12. A tab 68 on the plate 66 in notch 66 is aligned in the same direction as a stop 70 extending from frame 12, and a coil spring 72 is coupled therebetween. The coil spring 72 tensions an outer edge of plate 64 against the stop 70, and the force applied to the integrator 10 keeps it aligned in the vertical scanning position with respect to the scanning plane 25 (depicted in FIGS. 2 and 4).

When movement of the light integrator 10 to the standby position is commanded to drive the scanning gate frame 11 back and forth as described above, the stepper gear drive motor coupled to drive gear 78 is energized by drive pulses to rotate clockwise by the electronic control system. Drive gear 78 rotates gear disk 76 counter-clockwise, which in turn pivots plate 64 clockwise. Light integrator 10, and particularly the light input member 40, pivots clockwise against the force of the spring 72 from the scanning position shown in FIG. 4 to the standby position of FIG. 5. The number of stepper drive pulses delivered is counted by the electronic control unit.

In order to provide control and feedback, an electro-optical position sensor 80 is provided as shown in FIGS. 1, 4 and 5 mounted on block 84 on the frame 12. Normally the output signal of the sensor 80 is present when the dowel pin 82 extending from the upper tab area of the integrator 10 adjacent to the fastener 20 is in the position depicted in FIGS. 1 and 4. When the dowel pin 82 moves to the position of FIG. 5, it interrupts the output signal of sensor 80. The drive pulses to the stepper gear drive motor is halted and the count is saved. The stepper gear drive motor locks the drive gear 78 which in turn holds the light integrator 10 in the standby position against the return force of the spring 72.

When the return to the scanning position of FIG. 4 is commanded, the gear drive motor is energized in the opposite direction for a number of stepper drive pulses equaling the saved count. The plate 64 is rotated counter-clockwise by that number of stepper drive pulses, and the wheel 74 comes to rest at a position just short of pressuring the plate 64 against the stop 70. Instead, the spring 72 applies the pressure to seat the plate 64 against stop 70. The integrator 10 is thereby returned to the normal scanning position with respect to the film scanning plane 25.

There is some play in the dimensions of the U-shaped opening 66 and the wheel 74. During assembly, the operation may be fine tuned by adjustment of the positions of the sensor 80 on block 84 and the eccentrically mounted stop 70 to ensure the correct operation.

The particular drive system described for pivoting the light integrator may be modified in many respects. For example, a pivot arm from the stepper motor may be substituted for the gear disk 76 and drive gear 78. A bi-directional drive motor with low stalling torque may be substituted for the sensor and pulse counter control system. Other equivalent drive systems will be apparent to those skilled in the art.

As shown in FIGS. 4 and 5, the pivoting motion of the light integrator 10 and the light input member 40 between the scanning and standby positions is about the axis of the light input member 40. The narrow cone end opening 44 of the rotational light input member 40 remains aligned in a constant orientation to the slit 32. There is no possibility of disturbing this sensitive alignment or the alignment of the light bar end face 34 to the film scanning plane 25 when it is returned to the scanning position.

Moreover, the apparatus of the present invention embodied in the preferred embodiment described above provides a simple, compact light integrator that is sealed from dust and is readily movable out of the way to obtain access to the film scanning plane area without disturbing the seal.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1-5 light integrator 10
elongated frame 11
vertical frame 12
filmstrip take-up chamber 13
negative filmstrip clamp and scanning gate 14
filmstrip diverter 15
half sections 16 and 18
slide scanning gate 17
carriage 19
fasteners 20, 22 and 24
jaws 21, 23
film scanning plane 25
light integrating, cylindrical cavity 26
elongated cylindrical side wall 27
rectangular receptacle 28
rectangular light bar 30
interior end bar face 31
elongated slit 32
boss 33
closed exterior end bar face 34
closed interior end surface 35
cavity closed end 36
cavity end opening 37
cavity shoulder 38
light input end interior surface 39
rotational light input member 40
circular flange 41
conical, light conducting cavity 42
narrow cone end opening or input port 44
conical shaped reflective foil 45
wide cone end opening 46
pads 47, 49
transparent glass cover 48
sleeve bearing 50
thrust bearings 51, 53,
tungsten-halogen light source or lamp house 54
washers 55, 57, 59
flange 56
heat absorbing filters 58, 60
ring shaped spring fastener 61
filter wheel 62
fastener holes 63, 65
bolts 63', 65'
plate 64
U-shaped notch 66
bolts 67, 69
tab 68
stop 70
coil spring 72
wheel 74
gear disk 76
drive gear 78
position sensor 80
dowel pin 82
block 84

What is claimed is:

1. A linear light integrator of the type employed in a film scanner for integrating light from a light source of diverging illumination and forming a line of uniform intensity, diffuse illumination at a film scanning plane comprising:

an elongated generally cylindrical light integrating cavity having diffusely reflecting walls defining an input port in one end thereof through which light from said light source is introduced into said cavity, and a longitudinal slit in a side wall extending parallel to the longitudinal axis of said cavity through which reflected and integrated diffuse light exits said cavity;

an elongated light conducting bar associated with said elongated slit for conducting light exiting said slit in a direction extending away from said cavity and for emitting the conducted light in a line of uniform intensity, diffuse illumination from a sealed end face of said elongated light conducting bar at a predetermined distance from said exit slit adjacent said scanning plane;

a light input member for concentrating and conducting diverging light from said light source into said input port of said light integrating cavity; and a seal formed over said light input member formed of a material transparent to light emitted by said light source for sealing said light integrating cavity from the infiltration of contaminants.

2. The linear light integrator of claim 1 wherein:

said input port and said light input member are configured with respect to said light source for concentrating divergent light beams emitted by said light source and directing a concentrated light beam through said input port and along a side wall of said integrating cavity, such that the light beam is reflected and integrated in the cavity before exiting said elongated slit and entering said light conducting bar.

3. The linear light integrator of claim 2 wherein said input port is oriented at an angular displacement of greater than 0° and less than 180° with respect to said elongated slit so that the concentrated light beam entering said input port is not directed directly into said slit or against the side wall opposite to the slit and the reflection is nor directly visible through said light bar.

4. The linear light integrator of claim 2 wherein said angular displacement is at about 90°.

5. The linear light integrator of claim 1 wherein:

said light input member includes a relatively wide opening in a first end thereof having said seal formed therein and positioned to admit diverging light beams emitted by said light source and to concentrate and direct admitted light beams through said input port, said input port comprising a relatively narrow opening in the second end of said light input member to one side of said light integrating cavity axis, said light input member formed as a generally conically shaped light conducting cavity having an axis offset from to said light integrating cavity axis, whereby light entering said relatively wide opening is reflected through said light conducting cavity and out said narrow end opening along and onto a side wall of said light integrating cavity, such that the light beam is reflected and integrated in the cavity before exiting said elongated slit and entering said light conducting bar.

6. The linear light integrator of claim 5 wherein said input port is oriented at an angular displacement of greater than 0° and less than 180° with respect to said elongated slit so that the concentrated light beam entering said input port is not directed directly into said slit or against the side wall opposite to the slit and the reflection is nor directly visible through said light bar.

7. The linear light integrator of claim 6 wherein said angular displacement is at about 90°.

8. A linear light integrator of the type employed in a film scanner for integrating light from a light source and forming a line of uniform intensity, diffuse illumination at a film scanning plane comprising:

a light integrator housing formed with an elongated light integrating cavity having first and second ends, said first end being closed and said second end having an opening adapted to receive light from said light source, and a longitudinal side wall extending between said first and second ends, said ends and side walls formed with a diffusely-reflecting interior surface for diffusely reflecting light entering said opening, said longitudinal side wall having a longitudinally extending slit therein for emitting diffusely reflected light;

a generally planar, light conducting bar of a predetermined thickness, width and length for conducting light entering one end face through its length and emitting the light from the other end face, said light conducting bar oriented at said one end face with respect to said longitudinally extending slit for conducting light entering through said slit from said cavity along its length and for emitting the conducted light from the other end face as a line of diffuse illumination;

an elongated light input member having a first end oriented to said light source and a second end attached to said second end of said light integrator housing for conducting light from said light source entering said first end thereof into said light integrating cavity, said light input member formed with a relatively wide end opening in said first end and a relatively narrow end opening in said second end and a generally conically shaped light conducting cavity extending between said first and second ends; and a seal formed over said relatively wide opening of said elongated light input member formed of a material transparent to light emitted by said light source for sealing said light integrating cavity from the infiltration of contaminants.

9. The linear light integrator of claim 8 wherein:

said integrating cavity and said light input member each have a generally circular cross-section and a longitudinal axis;

said slit extends longitudinally in the side wall and parallel to the axis of said light integrating cavity; and said relatively wide and narrow openings in said first and second ends of said light input member are positioned in axial alignment with said light input member axis, and said relatively narrow opening is positioned in said elongated light integrating cavity second end to one side of said light integrating cavity axis, whereby the axes of said generally conically shaped light conducting cavity and said light integrating cavity are parallel and not in line with one another.

10. The linear light integrator of claim 9 wherein:

said relatively narrow opening is positioned in said second end of said light input member at an angular displacement of greater than 0° and less than 180° with respect to said elongated slit so that the concentrated light beam entering said input port is not directed directly into said slit or against the side wall opposite to the slit and the reflection is nor directly visible through said light bar.

11. The linear light integrator of claim 10 wherein said angular displacement is at about 90°.

12. In a film scanner having a film scanning plane into which negative filmstrips or positive film slides may be transported for scanning, a source of light and a light integrator for integrating light from said light source and forming a line of uniform intensity, diffuse illumination at said film scanning plane in a scanning position, the improvement comprising:

a frame for supporting said light source in a fixed position and for supporting said light integrator for movement between said film scanning position and a standby position; and means for moving said light integrator with respect to said frame into said film scanning position closely adjacent said scanning plane when film scanning is to be performed and into said standby position apart from said film scanning plane when access to said scanning plane is required.

13. The film scanner of claim 12 wherein said moving means is operable to move said light integrator into said standby position to obtain access to said scanning plane for preparing said film scanning plane for transport of negative filmstrip or slides into said scanning plane.

14. The film scanner of claim 12 wherein said light integrator further comprises:

a light integrator housing formed with an elongated light integrating cavity having first and second ends and a longitudinal side wall, a light input port adapted to receive light from said light source, and a longitudinally extending slit in said side wall for emitting diffusely reflected light;

a light conducting member oriented with respect to said longitudinally extending slit for remotely conducting light emitted by said slit as a line of diffuse illumination at a predetermined distance from said light integrator housing; and a light input member for conducting light from said light source through said input port and into said light integrating cavity; and wherein said moving means further comprises:

means for rotating said light integrator about an axis of said light input member between said scanning and said standby positions so that said light conducting member extends into close proximity to said film scanning plane in said scanning position and is pivoted away from said film scanning plane in said standby position.

15. The film scanner of claim 14 wherein:

said input port is formed in an end of said light integrator housing; and said light input member is formed as an elongated housing coupled in axial alignment with to said input port and extends between said input port and said light source; and wherein said rotating means further comprises:

bearing means in said frame and coupled to said elongated housing of said light input member for allowing said light integrator to pivot between said scanning position and said standby position on rotation of said light input member housing on said bearing means in first and second respective directions; and a drive motor selectively operable for engaging and rotating said light input member housing in said first and second directions.

16. The film scanner of claim 15 wherein said rotating means further comprises:

position sensor means positioned with respect to said frame for detecting the pivoting of said light integrator means into said standby position and for halting operation of said drive motor.

17. The film scanner of claim 12 wherein said light integrator further comprises:

a light integrator housing formed with an elongated generally cylindrical light integrating cavity having diffusely reflecting walls defining an input port in one end thereof through which light from said light source is introduced into said cavity, and a longitudinal slit in a side wall extending parallel to the longitudinal axis of said cavity through which reflected and integrated diffuse light exits said cavity;

an elongated light conducting bar associated with said elongated slit for conducting light exiting said slit in a direction extending away from said cavity and for emitting the conducted light in a line of uniform intensity, diffuse illumination from a sealed end face of said elongated light conducting bar at a predetermined distance from said exit slit and adjacent said scanning plane in said scanning position;

a light input member for concentrating and conducting diverging light from said light source into said input port of said light integrating cavity; and a seal formed over said light input member formed of a material transparent to light emitted by said light source for sealing said light integrating cavity from the infiltration of contaminants; and wherein said moving means further comprises:

means for rotating said light integrator about an axis of said light input member between said scanning and said standby positions so that said sealed end face of said elongated light conducting bar extends into close proximity to said film scanning plane in said scanning position and is pivoted away from said film scanning plane in said standby position.

18. The film scanner of claim 17 wherein:

said light input member is formed as an elongated housing coupled axially with said integrator housing end extending between said input port and said light source; and wherein said rotating means further comprises:

bearing means in said frame and coupled to said elongated housing of said light input member for allowing said light integrator to pivot between said scanning position and said standby position on rotation of said light input member housing on said bearing means in first and second respective directions;

a drive motor selectively operable for engaging and rotating said light input member housing in said first and second directions; and means foe operating said drive motor in first and second directions.

19. The film scanner of claim 18 wherein said rotating means further comprises:

position sensor means positioned with respect to said frame for detecting the pivoting of said light integrator means into said standby position and for providing a standby position signal; and means responsive to said standby position signal for halting operation of said drive motor.

* * * * *